US006203330B1

(12) United States Patent
Buchholtz

(10) Patent No.: US 6,203,330 B1
(45) Date of Patent: Mar. 20, 2001

(54) METHOD FOR COMMUNICATING WITH A PORTABLE DATA MEDIUM

(75) Inventor: Jacques Buchholtz, St Remy les Chevreuse (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/242,012

(22) PCT Filed: Jun. 12, 1998

(86) PCT No.: PCT/FR98/01229

§ 371 Date: Feb. 5, 1999

§ 102(e) Date: Feb. 5, 1999

(87) PCT Pub. No.: WO98/57289

PCT Pub. Date: Dec. 17, 1998

(30) Foreign Application Priority Data

Jun. 13, 1997 (FR) .................................................. 97 07320

(51) Int. Cl.⁷ .............................. H01R 12/00; H05K 1/00
(52) U.S. Cl. ............................................. 439/66; 200/511
(58) Field of Search ............................. 439/66; 235/441; 200/512, 511

(56) References Cited

U.S. PATENT DOCUMENTS

| | | | | |
|---|---|---|---|---|
| 3,541,222 | * | 11/1970 | Parks ....................................... | 439/66 |
| 4,184,729 | * | 1/1980 | Parks et al. ............................. | 439/66 |
| 4,891,013 | * | 1/1990 | Komaki ................................... | 439/66 |
| 5,338,232 | * | 8/1994 | Bernier ................................... | 439/733 |
| 5,517,011 | * | 5/1996 | Vandenengel ........................ | 235/441 |
| 5,531,022 | * | 7/1996 | Beaman et al. ........................ | 439/66 |
| 5,661,279 | * | 8/1997 | Kenmochi ............................ | 200/512 |

FOREIGN PATENT DOCUMENTS

| | | |
|---|---|---|
| 4415022 | 3/1995 | (DE) . |
| 4418609 | 11/1995 | (DE) . |
| 0713189 | 5/1996 | (EP) . |

\* cited by examiner

Primary Examiner—Khiem Nguyen
Assistant Examiner—Hae Moon Hyeon
(74) Attorney, Agent, or Firm—Miles & Stockbridge P.C.; Edward J. Kondracki

(57) ABSTRACT

The invention relates to a card reading device for communicating with a portable data medium (2) such as a credit card or smart card. The reader included at least one first electrical contact (44) that cooperates with at least one second electrical contact (24) of the portable data medium through a connector (3). The connector (3) comprises a sheet (31) having at least one area forming a first conducting element (34) disposed so as to cooperate with each of the first and second contacts (24, 44) of the portable data medium and reader. The device comprises a first applicator for applying a compressing force to the contacts (24, 44) in order to press the first conducting element (34) against each of the first and second contacts (24, 44) and for discontinuing the application of the force in order to move the first conducting element (34) away from the contacts (24, 44). The first conducting element (34) comprises an electrically conductive mass made of elastomer. In line with each conducting element (34) is a switch which serves to detect the presence of the card in the reader. The switch includes a contact (44) and a conducting pad (39) which serves as a switching element that cooperates with a pair of fixed contacts (49a, 49b). The device includes a lip (80) configured to close a slot through which the portable data medium is inserted, which the data medium is not present.

11 Claims, 3 Drawing Sheets

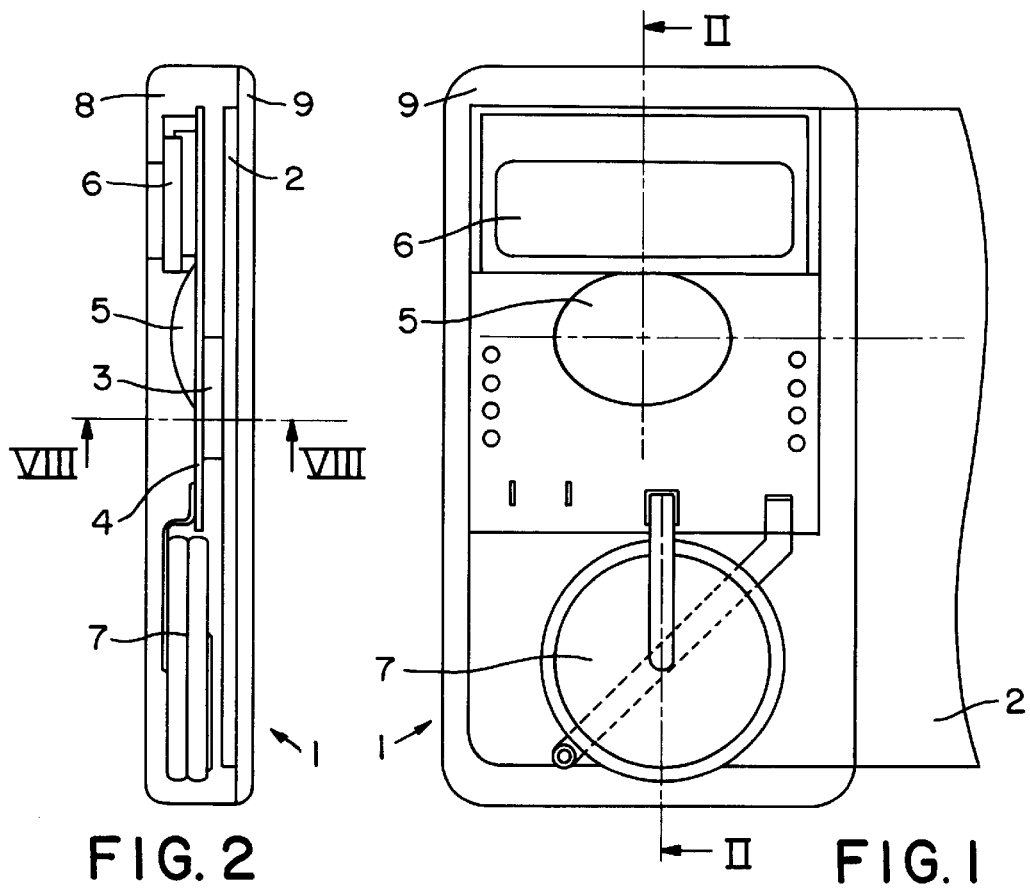
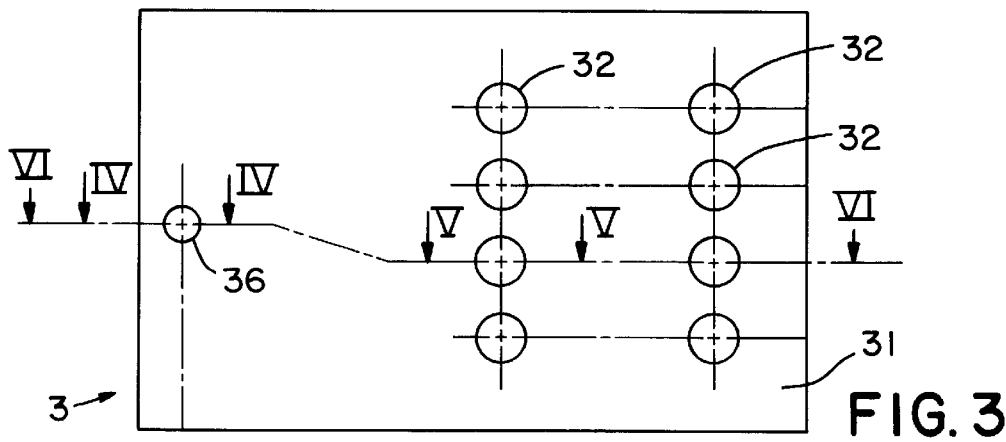
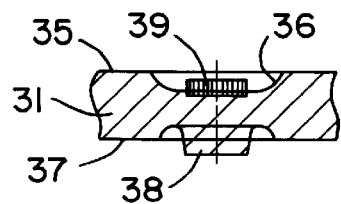
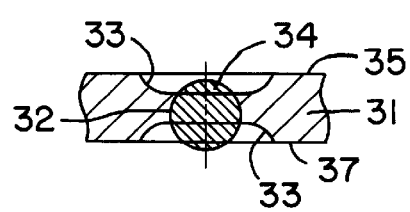

METHOD FOR COMMUNICATING WITH A PORTABLE DATA MEDIUM

BACKGROUND OF THE INVENTION

1. Field of the Invention

The invention relates to a device for communicating with a portable data medium and comprising for this purpose an electrical contact intended to cooperate with at least one electrical contact of the portable data medium through connecting means, in which said connecting means comprise a sheet extending between the electrical contact of the device and the electrical contact of the portable data medium and having at least one area forming a first conducting element running through a thickness of the sheet and disposed so as to cooperate with each of said contacts, and the device comprises force application means for applying a compressing force to the contacts in order to press said first conducting element against each of said contacts, and for discontinuing the application of said force in order to move said first conducting element away from the contacts.

The portable data medium is constituted, in particular, by a card of the credit card type equipped, in an intrinsically known way, with a microprocessor chip or a logical circuit chip for processing data, and carrying a plurality of electrical contacts intended to cooperate with an equal number of contacts carried by the device, as described, in particular, in U.S. Pat. No. 4,211,919. The device can be any unit intended to exchange information with the portable data medium within the framework of any procedure, such as a financial operation, a verification of a user's access to a site, etc.

2. Description of Related Art

Conventionally, the connecting means comprise a comb attached to the device and carrying a plurality of juxtaposed flexible metal pins. These pins are connected to the contacts of the device and are intended to cooperate elastically with the contacts of the portable data medium. Other connecting means having metal springs also exist. This type of connecting means has the drawback of being expensive to produce due to the metal cutting operations it involves.

The object of the invention is to offer a device of the type mentioned at the beginning of the specification, wherein the means for connecting to the portable data medium are less expensive to produce.

To this end, according to the invention, said first conducting element comprises an electrically conductive mass made of elastomer.

BRIEF DESCRIPTION OF THE DRAWINGS

Other characteristics and advantages of the present invention will emerge more clearly through the reading of the following description of an exemplary embodiment of the device, illustrated with the aid of the following figures, in which:

FIG. 1 is a top view of the inside of a portable data medium reader in the process of cooperating with a portable data medium;

FIG. 2 is a sectional view along the line II—II of FIG. 1;

FIG. 3 is a top view of the connector with which the reader is equipped;

FIG. 4 is a partial sectional view along the line IV—IV of FIG. 3;

FIG. 5 is a partial sectional view along the line V—V of FIG. 3;

DESCRIPTION OF THE PREFERRED EMBODIMENT(S)

Figure 6A:
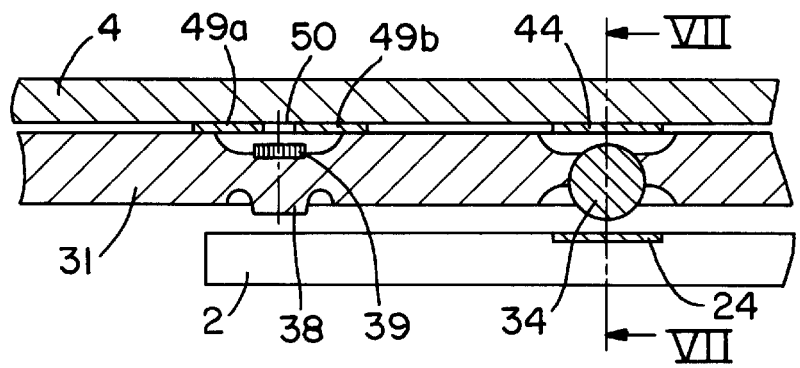
FIGS. 6a through 6c are three partial sectional views along the line VI—VI of FIG. 3 when the reader is cooperating with the portable data medium, illustrating three successive phases of a procedure for putting these two devices in contact.

FIGS. 1 and 2 represent a chip card reader 1 capable of receiving a card 2 of the credit card type equipped, in an intrinsically known way, with a microprocessor chip or a logical circuit chip for processing data, and carrying a plurality of electrical contacts intended to cooperate with an equal number of contacts carried by the reader, through a connector 3.

In this example, the reader 1 is portable and is so small in size that it receives only one end of the card carrying said chip: in particular, its function is to allow a holder of this card reader to read an account balance recorded in the card. It comprises a printed circuit 4 carrying on a top side a microprocessor chip 5 and a display 6, and on a bottom side, said connector 3, attached to the printed circuit 4 by suitable means. These means can be constituted by, among other things:

- bonding by means of applied glue, or a double-sided adhesive layer;
- pins carried by the connector 3, which pass through the printed circuit 4 and are folded down onto it;
- a screw connection.

The reader 1 also comprises a set of batteries 7. A case encloses the reader 1 and comprises a body 8 that receives the various elements of the reader 1 and a cover 9 that covers the body 8 and creates with it a lateral slot for the card 2 to pass through in such a way that the contacts of the latter line come face-to-face with the connector 3.

The connector 3 in FIGS. 3 through 5 comprises a body 31 constituted by a thick rectangular sheet made of flexible, electrically insulating material. According to a preferred embodiment, the body 31 is made of elastomer. It comprises a plurality of circular through-holes 32, disposed in the same way as the contacts of the card 2 and equal in number to the latter (in this case, eight). In line with each hole 32, and on each side of the connector 3, is a circular recess 33 that reduces the thickness of the body 31 at this point.

In each hole 32 is a conducting element formed by a conducting sphere 34 constituted by an elastomer material such as silicone rubber incorporating a filler that renders it electrically conductive. Typically this filler is silver or carbon. Each conducting sphere 34 has a diameter slightly larger than that of the hole 32 so that the latter exerts a certain peripheral pressure on the conducting sphere 34. Thus, each conducting sphere 34 is elastically held in the corresponding hole 32. Each conducting sphere 34 is mounted on the body 31 in such a way that it is set back from one side 35 of the body 31 intended to cooperate with the printed circuit 4 of the reader 1, and that, on the other hand, it projects past an opposite side 37 of the body 31 intended to cooperate with the card 2.

Apart from the holes 32, the body 31 of the connector 3 has, on its side 35 intended to cooperate with the printed circuit 4 of the reader 1, a circular recess 36, and on its side 37 intended to cooperate with the card and in line with the recess 36, a substantially cylindrical projection 38 extending perpendicular to the body toward its exterior. The projection 38 is such that it projects past the surface of the body 31.

In the recess 36 of the body 31 is a circular conducting pad 39 made of a rigid or flexible electrically conductive material. In this example, it is made of the same material as the conducting spheres 34. The disposition is such that the conducting pad 39 is set back from the surface of the body 31. The conducting pad 39 is attached to the body 31 by any suitable means, particularly by bonding or embossing.

The operation of the connector 3 will now be explained in reference to FIGS. 6a through 6c. FIG. 6a shows the card 2 as it is inserted into the reader 1. The printed circuit 4 of the reader 1 carries, in line with each conducting sphere 34 of the connector 3, a flat and preferably circular contact 44, and in line with the only conducting pad 39 of the connector 3, a pair of flat and preferably circular contacts 49a, 49b disposed side-by-side with a nonconductive space 50 interposed. The space 50 is disposed facing the conducting pad 39 and is smaller in size. All of the contacts 24, 44, 49a, 49b are made of a standard metallic material used in printed circuits; typically, it is a multilayer compound comprising a copper layer covered by a nickel layer, followed by a gold or tin-lead layer. The two contacts 49a, 49b constitute two fixed parts of a switch whose moving part is constituted by the conducting pad 39; this switch serves to detect the presence of the card in the reader. In the situation of FIG. 6a, given the above-mentioned setbacks or projections of the conducting elements, there is no electrical continuity between the contacts 24 and 44 on the one hand, and between the contacts 49a and 49b on the other hand, since the conducting elements are not touching any electrical contact.

Figure 6B:
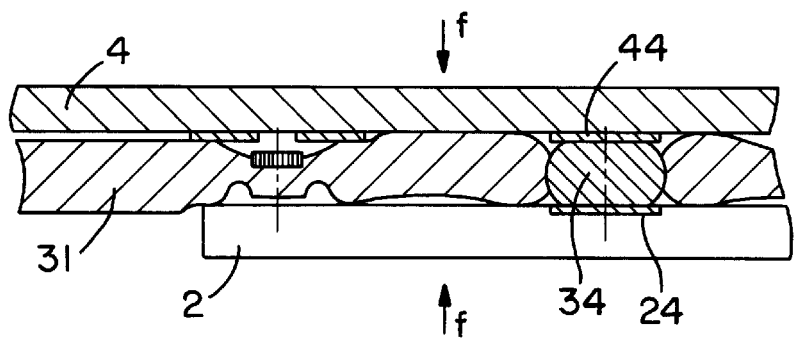
Figure 6C:
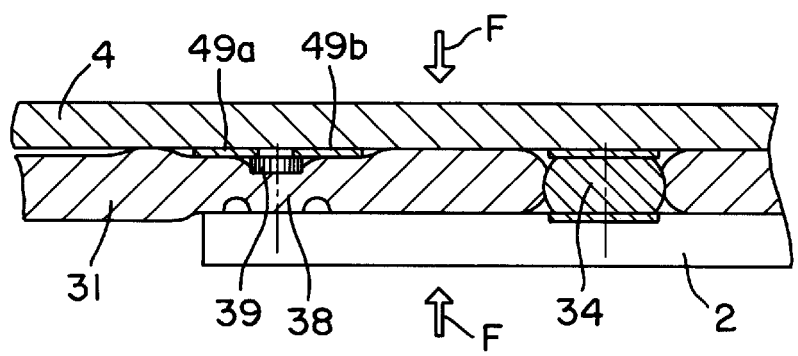

FIG. 6b represents an intermediate contact phase in which the card 2 and the printed circuit 4 of the reader 1 are moved toward one another. This was obtained by taking advantage of a certain deformability of the case of the reader 1; the user of the reader 1 must manually exert an average force f from both sides of the case, i.e., on its body 8 and on its cover 9 (see FIG. 6b) in order to move them toward one another. This deformability could be obtained in several ways, including the following:

providing a case constituted by a deformable material (for example plastic);

providing a case whose cover 9 is elastically mounted on the it. body 8, i.e., by means of deformable intermediate connecting elements, for example elastomer elements.

The result of the force f exerted by the user is that electrical continuity is produced by the conducting spheres 34 between the contacts 24, 44, though not yet by the conducting pad 39, since the projection 38 is not yet being acted on by the card 2. This result is obtained by properly adjusting the respective setbacks and projections of the conducting spheres 34 and the conducting pad 39, as well as the height of the projection 38. It may be seen that the conducting spheres 34 have been subject to a compression, producing an increase in their diameter.

By exerting a greater force F, the user reaches a final contact phase (FIG. 6c) in which the conducting pad 39 also produces electrical continuity between the two contacts 49a, 49b. In effect, during the larger movement of the card 2 toward the reader 1, the reader exerts a pressure on the projection 38 in such a way that the conducting plate 39 is pushed toward the printed circuit 4 of the reader 1 until it touches the contacts 49a, 49b.

The sequencing of the two above-mentioned contact phases advantageously makes it possible to meet the requirements of ISO standard 7816-3, which defines the sequence for generating the signals that must be applied to the card, since the reader 1 will only supply power to the card after having determined that the switch 49a, 49b is closed.

Naturally, the progressive release of the force F will result in a disconnection of the contacts in the reverse order from that described for the contact phase, i.e., first the retraction of the conducting pad 39, then the retraction of the conducting sphere 34, again in accordance with the requirements of ISO standard 7816-3.

It must be noted that it is necessary to precisely adjust the force F required to obtain the closing of the switch 49a, 49b, as well as the height of the projection 38, so as not to exceed a maximum force $F_{max}$ that the chip of the card can withstand without damage. Typically, $F_{max}$ is on the order of 50 grams. This adjustment can be obtained by acting on the respective dimensions of the parts and the hardness of the elastomer material chosen.

One refinement of the invention is characterized in that at least some of the conducting elements are constituted so as to have a given electrical resistance, in order to advantageously replace resistors ordinarily embodied in the form of discrete components, and are imprinted on the printed circuit 4 of the reader 1. The resistance value thus constituted must be measured while the force F is applied in order to take into account the influence of this force on the resistance value.

Naturally, the conducting elements could exist in any appropriate form other than those described above. For example, the conducting spheres 34, could be replaced by cylinders. Moreover, the conducting elements, instead of being attached to the body 31 of the connector 3, could be embodied in the mass of the body 31, at the same time as the latter.

Figure 7:
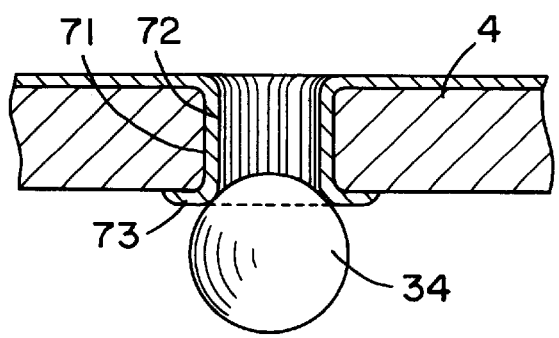
FIG. 7 is a partial sectional view along the line of VII—VII of FIG. 6a of the printed circuit 4, showing a practical embodiment of any one of its contacts, cooperating with a conducting element.

FIG. 7 illustrates a practical, and intrinsically known, embodiment of one of the contacts 44, 49a, 49b of the printed circuit 4. The printed circuit 4 has a cylindrical through-hole 71 covered by a conductive layer 72 that joins the two sides of the printed circuit 4. On its side intended to cooperate with the card 2, the conductive layer 72 forms a circular ring 73 constituting a contact with which the conducting sphere 34 is intended to cooperate; advantageously, the ring 73 constitutes a means for the self-centering of the conducting sphere 34.

Figure 8A:
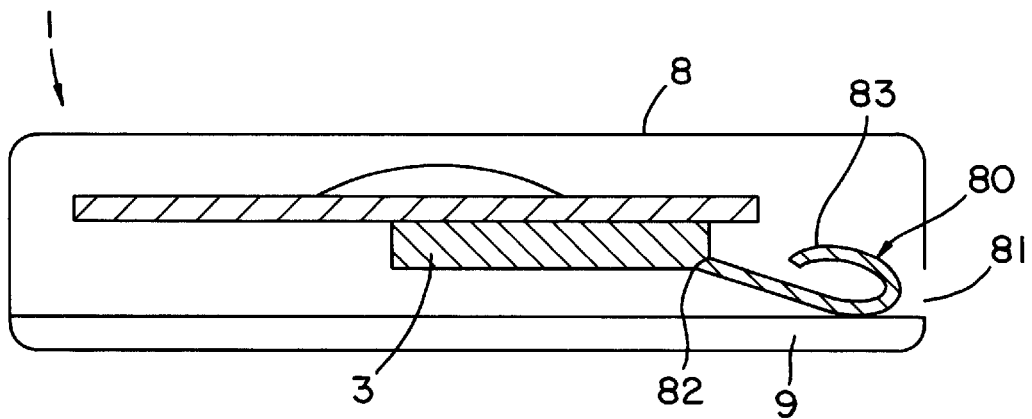
FIG. 8a is a sectional view along the line VIII—VIII of FIG. 2, showing a refinement of the invention comprised of adding a lip for closing the slot of the reader 1, while FIG. 8b differs from FIG. 8a in that it shows the reader 1 once the card has been inserted.

FIG. 8a shows a refinement of the invention comprised of adding a lip 80 to the reader 1 for closing the slot 81 through which the card 2 is inserted, when the latter is absent. This disposition has the advantage of preventing foreign bodies or dirt from getting into the reader 1, which could be harmful to its operation.

The lip 80 extends along the entire width of the slot 81. In this example, it is constituted by an elastomer sheet, formed of one piece with the elastomer connector 3 and folded back on itself. It has two longitudinal edges 82, 83, one of which 82 is connected to an edge of the connector 3 located next to the slot 81, and the other of which 83 is free.

Figure 8B:
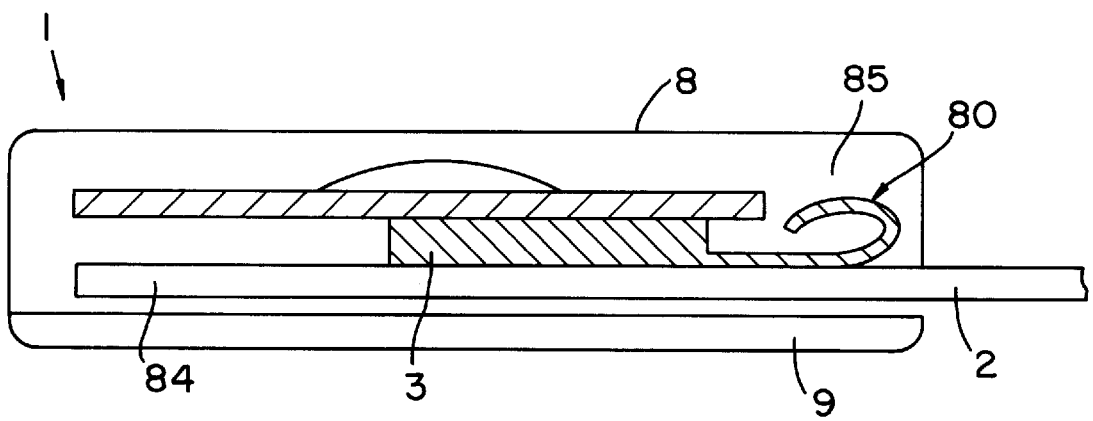

FIG. 8b differs from FIG. 8a in that it shows the reader 1 once the card has been introduced. It is noted that the lip 80 is pushed back laterally by a front end 84 of the card, as the latter passes through the slot 81, into a space 85 provided in the body 8 of the case for receiving this lip 80. After the removal of the card, the lip 80 elastically returns to its position in FIG. 8a.

In a variant, the lip 80 is distinct from the connector 3 and connected to it.

In a variant that does not include a switch 39, 49a, 49b, it is possible to make the connector 3 of a rigid material, while the conducting spheres 34 intended to cooperate with the card are still made of elastomer. In this case, each conducting element such as sphere 34 intended to cooperate simultaneously with the printed circuit 4 and the card 2 must project from each side of the connector 3, in order to guarantee that it will actually come into contact with them.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A reading device for receiving and communicating with a portable data medium (2) comprising:

at least one first electrical contact (44) cooperating with at least one second electrical contact (24) of the portable data medium;

a connector (3) comprising a sheet (31) extending between the first electrical contact (44) of the reading device and the second electrical contact (24) of the portable data medium when operably received in the device, and having at least a first electrically conducting element (34) extending through a thickness of the sheet and disposed so as to cooperate with each of said first and second contacts (24, 44) of the portable data medium and reading device, said first conducting element (34) comprising an electrically conductive elastomer mass; and a force applicator (8, 9) having in a first position when said data medium is received in said reading device to apply a compressing force to the first and second contacts (24, 44) in order to press each of said first and second contacts (24, 44) against said first conducting element (34), and in a second position to remove the compressing force so as to move said first conducting element (34) away from the first and second contacts (24, 44).

2. The device according to claim 1, in which said first conducting element (34) is an insert housed in an aperture (32) of the sheet (31).

3. The device according to claim 2, in which the first conducting element (34) is in the shape of a sphere.

4. The device according to claim 1, in which the conducting element (34) has an electrical resistance of predetermined value.

5. The device according to claim 1, in which said sheet (31) is made of elastomer.

6. The device according to claim 1, in which said sheet (31) comprises a first side and a second side wherein said at least one first electrically conducting element (34) is disposed therebetween for operable electrical contact with said at least one second electrical contact (24) of the portable data medium when operably received, each said first and second side including a respective recess (33) that reduces the thickness of the sheet (31) adjacent to said electrically conducting element (34); and a second conducting element (39) disposed on said sheet to as to cooperate with two further contacts (49a, 49b) of the device when the force applicator (8, 9) is activated.

7. The device according to claim 6, in which the second conducting element (39) is in the form of a pad located in a second recess (36) on the first side of the sheet (31), and further including a projection (38) located on the second side of the sheet (31) opposite the first side, the projection (38) and the second conducting element (39) being in alignment, for cooperating with the portable data medium (2).

8. The device according to claim 6, in which the first (34) and second (39) conducting elements are disposed so that an activation of the force applicator (8, 9) causes a sequential connection of the first conducting element (34) with the contacts (24, 44), then of the second conducting element (39) with the contacts (49a, 49b), while a deactivation of the force applicator (8, 9) discontinues the cooperation of the second conducting element (39) with the contacts (49a, 49b), then of each first conducting elements (34) with the contacts (24, 44).

9. The device according to claim 1, wherein said applicator (8,9) comprises a body (8) and a cover (9) constituting a case that receives the portable data medium (2).

10. The device according to claim 1, further including a slot (81) for insertion of the portable data medium (2), said sheet having a lip (80) disposed so as to close said slot in the absence of the portable data medium, and to fold away when the portable data medium is inserted into the slot.

11. The device according to claim 6, further including two contacts (49a, 49b) of the device arranged to cooperate with said force applicator (8,9).

\* \* \* \* \*